(12) United States Patent
Rao et al.

(10) Patent No.: US 7,230,568 B2
(45) Date of Patent: Jun. 12, 2007

(54) GPS RECEIVER HAVING A PHASE LOCK LOOP HOLD OFF

(75) Inventors: Krishnaranjan S. Rao, Sunnyvale, CA (US); Gregory C. Best, San Francisco, CA (US); Jeffrey D. Sanders, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 420 days.

(21) Appl. No.: 10/982,158

(22) Filed: Nov. 5, 2004

(65) Prior Publication Data

US 2006/0097914 A1 May 11, 2006

(51) Int. Cl.
*G01S 5/14* (2006.01)

(52) U.S. Cl. .................................. 342/357.12

(58) Field of Classification Search .......... 342/357.12; 455/164.1, 164.2, 192.2, 260
See application file for complete search history.

(56) References Cited

U.S. PATENT DOCUMENTS 4,955,075 A * 9/1990 Anderson ................ 455/182.2
5,390,207 A * 2/1995 Fenton et al. ........... 342/357.12

* cited by examiner

*Primary Examiner*—Thomas H. Tarcza
*Assistant Examiner*—Fred H. Mull
(74) *Attorney, Agent, or Firm*—Menlo Patent Agency LLC; David R. Gildea (57) ABSTRACT

A global navigation satellite system (GNSS) receiver using phase lock loops for strong GNSS signals and automatic frequency control (AFC) loops for weak GNSS signals on a satellite-by-satellite basis. The phase lock loops or the AFC loops associated with particular GNSS satellites generate frequency feedback adjustments for tracking the carrier frequencies of the incoming GNSS signals in order to determine pseudoranges for calculating a location fix. The transition from an AFC loop to a phase lock loop is controlled for each GNSS signal depending on location quality parameters including a history of previous loop transitions, knowledge of whether a transition is in-progress, and a conditional PDOP. The conditional PDOP is the calculated PDOP where the pseudorange from the particular GNSS signal is removed from the computation of the location fix.

52 Claims, 8 Drawing Sheets

GPS RECEIVER HAVING A PHASE LOCK LOOP HOLD OFF

BACKGROUND OF THE INVENTION

1. Field of the Invention

The invention relates generally to global navigation satellite system (GNSS) receivers and more particularly to GNSS receivers and methods for tracking weak and strong GPS signals by switching between an AFC loop and a phase lock loop.

2. Description of the Background Art

Global navigation satellite system (GNSS) receivers operate by adjusting the phase of a local replica code to the phase of a pseudorandom (PRN) code carried on an incoming GNSS signal. A global positioning system (GPS) is an example of a GNSS receiver.

The local code phase in a GNSS receiver is converted to a range between the local antenna location and the location-in-space of the GNSS satellite transmitting the GNSS signal carrying that particular code. The range is termed a "pseudorange" because the range includes local receiver clock error. In the simplest case, four pseudoranges are needed for resolving the phase offset error and computing a location fix having time and three dimensions of geographic location. Fewer than four pseudoranges can be used if some other information such as altitude or time is available.

More than four pseudoranges can be used for an over-determined solution in order to improve the accuracy of the location fix. GNSS receivers for survey and other applications that require precise locations use carrier phase and differential pseudorange corrections provided by a reference GNSS receiver.

The GNSS receiver must track the frequency of the carrier of the incoming GNSS signal before measuring the pseudorange. The carrier frequency is tracked by generating a frequency feedback adjustment to adjust the frequency of an internal local oscillator (LO) signal (or combination of LO signals) to match the frequency of the carrier. It is important that the LO signal frequency have as little phase noise as possible because phase noise on the LO signal causes noise on the pseudoranges. Noise on the pseudoranges results in less accurate location fixes.

Existing GNSS receivers use a phase lock loop (PLL) for generating a low noise LO signal. However, phase lock loops can cycle-slip or lose lock unless the GNSS signal is relatively strong. In order to operate with weak GNSS signals, some GNSS receivers use an automatic frequency control (AFC) loop for the LO signal. The LO signal frequency provided with an AFC loop is noisier than with a phase lock loop, and the AFC loop does not output the higher accuracy carrier phase measurements, but the AFC loop operates more reliably at lower GNSS signal strengths.

Phase locking with a phase lock loop may take several seconds in order for the phase lock loop to settle to an equilibrium state. During this time period the pseudorange measurement is not available. When that pseudorange measurement is one of the minimum set that is being used for a location fix (four in the simplest case) then no location fix is available during the time that the phase lock loop is settling. Even when the location fix is using more than the minimum set of pseudoranges, the location fix is subject to jumps before and after the phase lock loop settles when the GNSS receiver makes the transition to the phase lock loop. These problems may be tolerable when the signal strength does not often change between weak and strong. Unfortunately, there are cases where the GNSS signal strength changes rapidly such as when the GNSS signal is subject to multipath or the GNSS receiver is beneath a tree canopy. When the GNSS receiver is beneath a tree canopy, the loop transition problem may occur each time the GNSS satellite or the GNSS receiver moves just enough to pass by a branch or leaf in the line-of-sight between the satellite and the receiver.

SUMMARY OF THE INVENTION

The present invention is a global navigation satellite system (GNSS) receiver preferring phase lock loops for strong GNSS signals and (AFC) loops for weak GNSS signals on a signal-by-signal basis. The phase lock loop or the AFC loop associated with a particular GNSS signal generates a frequency feedback adjustment for tracking the carrier frequency of the incoming GNSS signal in order to determine a pseudorange. The pseudoranges for several GNSS signals are used for calculating location fixes.

The transition from an AFC loop to a phase lock loop is controlled for a particular GNSS signal depending on location quality parameters including a history of previous loop transitions, knowledge of whether a transition is in-progress, and a conditional position dilution of precision (PDOP) associated with the particular GNSS signal. The conditional PDOP is the calculated PDOP where the pseudorange for the particular GNSS signal is removed from the computation of the location fix.

In a preferred embodiment, when a GNSS signal level is currently strong enough for reliable signal tracking with the phase lock loop, the GNSS receiver normally makes a transition from the AFC loop to the phase lock loop. However, before making the decision to make the transition, the GNSS receiver assesses one or more supplemental location quality parameters.

When the assessment of the parameters indicate that the location consistency is likely to be degraded by the transition, the GNSS receiver delays or prevents the transition by generating a PLL hold-off. The location quality parameters include recent experience of loop transitions for the GNSS signal being considered, elapsed time following a loop transition for another GNSS signal, knowledge of in-progress transitions for other GNSS signals, and the conditional PDOP associated with the GNSS signal being considered. The PLL hold-off may be generated when recent experience of the GNSS signal being considered shows frequent transitions, when another GNSS signal has a loop transition currently in progress or has had a recent loop transition, or when the conditional PDOP is high.

An advantage of the present invention is that GNSS-based location fixes are more consistent with fewer outages and fewer location jumps.

This and other advantages of the present invention will no doubt become obvious to those of ordinary skill in the art after having read the following best mode for carrying out the invention and viewing the various drawings.

DETAILED DESCRIPTION OF THE PREFERRED EMBODIMENTS

The details of the preferred embodiments for carrying out the idea of the invention will now be described. It should be understood that the description of these details of the preferred embodiments is not intended to limit the invention to these details. On the contrary, numerous alternatives, modifications and equivalents of the embodiments described herein will be apparent to someone skilled in the art. The preferred embodiment of the invention is described for the global positioning system (GPS). However, it will be apparent to those in the art that the invention may be carried out with any global navigation satellite system (GNSS) including the global positioning system (GPS), the global orbiting navigation system (GLONASS) and the Galileo system or a hybrid of these systems.

Figure 1:
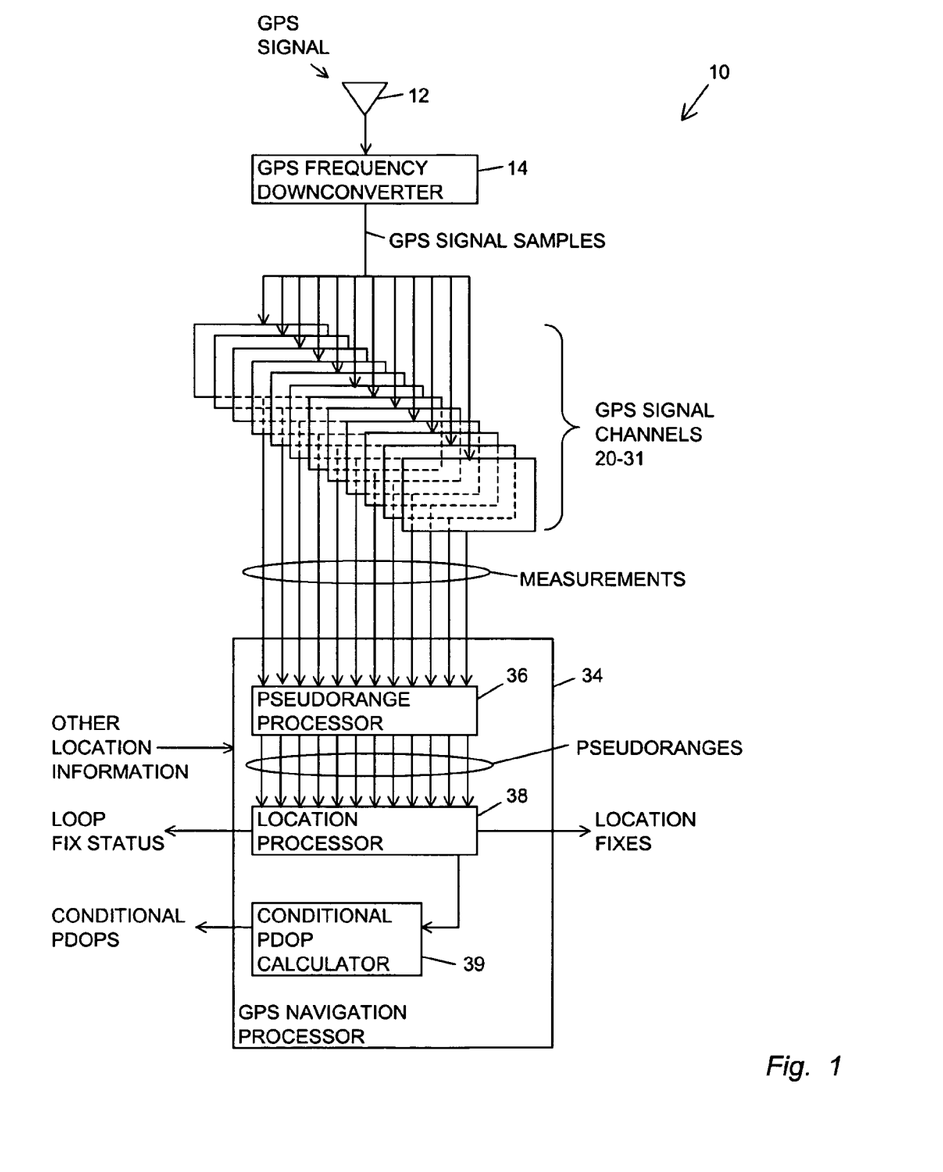
FIG. 1 is a block diagram of a GPS receiver of the best mode of the present invention.

FIG. 1 is a block diagram of a GPS receiver of the present invention referred to with a reference number 10. The GPS receiver 10 includes a GPS antenna 12, a GPS frequency downconverter 14, twelve GPS signal channels 20–31, and a GPS navigation processor 34. The GPS antenna 12 receives radio wave GPS signals from GPS signal sources and passes the GPS signals in a conducted form to the GPS downconverter 14. Typically the GPS signal sources are GPS satellites so the term satellites is used to represent signal sources. However, it should be understood that other types of airborne or terrestrial signal sources, such as pseudolites, can be used in place of satellites.

The GPS frequency downconverter 14 downconverts the radio frequency of the GPS signals and provides digitized signal samples of the lower frequency GPS signals to the GPS signal channels 20–31. The GPS signal channels 20–31 include digital signal processing and microprocessor hardware and software for making measurements of the GPS signal. The measurements include raw code phases, carrier frequency and carrier phase. The raw code phase measurements are simply called code phases herein. The GPS navigation processor 34 includes a pseudorange processor 36, a location processor 38, and a conditional position dilution of precision (PDOP) calculator 39. The conditional PDOP calculator 39, described in greater detail below, determines conditional PDOPs for GPS satellite constellations that exclude specific available GPS satellites.

The pseudorange processor 36 converts the measurements to pseudoranges for respective GPS satellites. The location processor 38 uses the pseudoranges for determining a location fix for the GPS receiver 10. Four pseudoranges are used for providing a 3D location fix having GPS-based time and three dimensions of GPS-based geographical location. The location fix may be computed with fewer than four pseudoranges when other location information, such as a current altitude, time, map matching or dead reckoning is available from another source. Three pseudoranges plus a recent determination of altitude are used for a 2D location fix having the time and two dimensions of the geographical location. Preferably, more than four pseudoranges can be used for an over-determined solution in order to improve the accuracy of the location fix.

Each GPS signal channel 20–31 makes measurements to a single GPS satellite to which it is assigned. The GPS receiver 10 is shown with twelve GPS signal channels 20–31 for determining twelve sets of measurements, respectively, for twelve GPS satellites, respectively. However, there can be any number of GPS signal channels 20–31 from one to twelve or more. The GPS signal channels 20–31 are shown in parallel. However, the same physical hardware devices and software programs may be time shared by the GPS signal channels 20–31.

Figure 2:
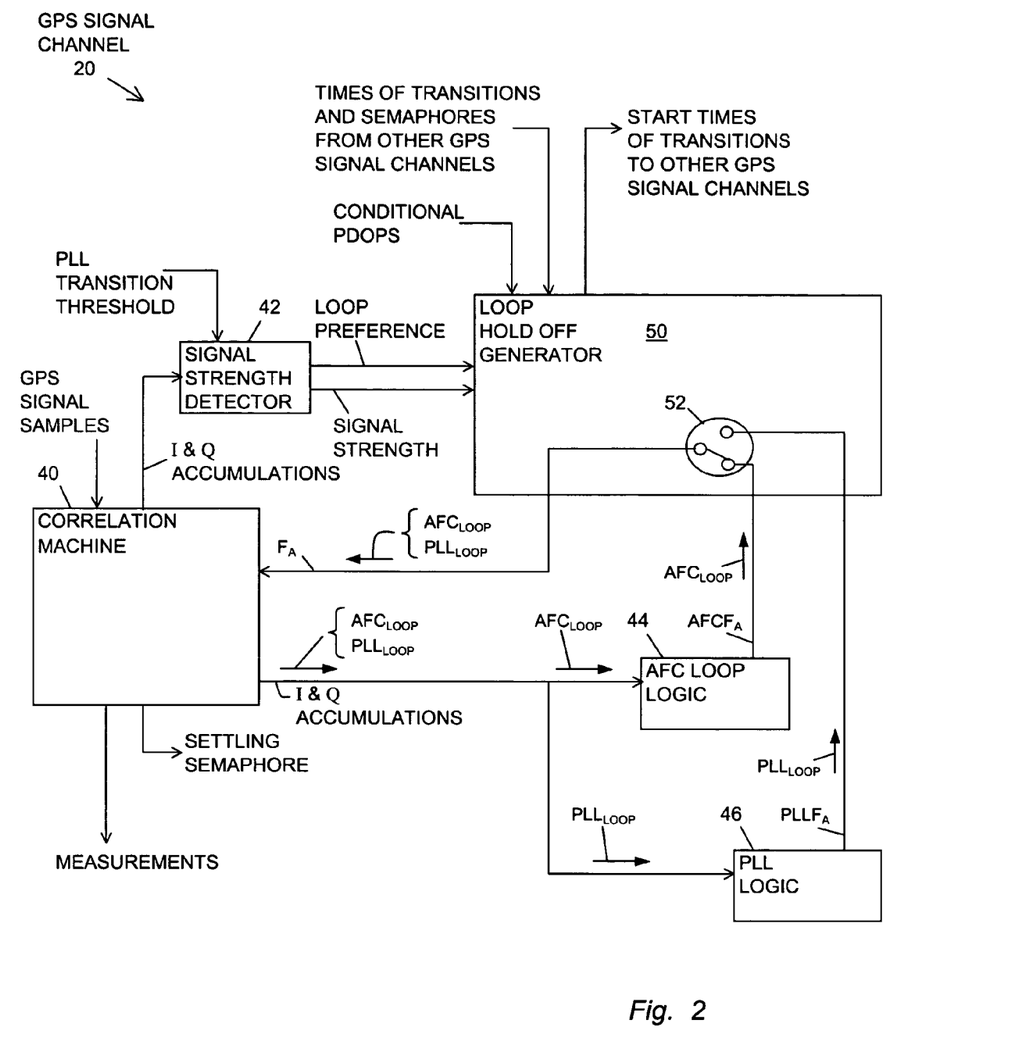
FIG. 2 is a block diagram of a GPS signal channel for the GPS receiver of FIG. 1.

FIG. 2 is a block diagram of a first GPS signal channel 20. The choice of the GPS signal channel 20 as the "first" is arbitrary and does not mean that it is the first to have signal power or imply any other difference with respect to the GPS signal channels 21–31. The GPS signal channel 20 includes a correlation machine 40, a signal strength detector 42, an automatic frequency control (AFC) loop, designated as $AFC_{LOOP}$, including AFC logic 44, a phase lock loop (PLL), designated as $PLL_{LOOP}$, including PLL logic 46, and a loop hold-off generator 50 including a loop switch 52. The loop hold off generator 50, described in greater detail below, examines the history of loop transitions between the AFC loops and phase lock loops in the GPS receiver 10 and examines the conditional PDOPs for determining whether to generate a PLL hold-off.

When the AFC loop is closed, the AFC loop receives the I and Q accumulations from the correlation machine 40 and issues an AFC frequency feedback adjustment $AFCF_A$. When the phase lock loop is closed, the phase lock loop receives the I and Q accumulations from the correlation machine 40 and issues a PLL frequency feedback adjustment $PLLF_A$. The loop switch 52 is shown in the closed position for the AFC loop. The AFC frequency feedback adjustment $AFCF_A$ or the PLL frequency feedback adjustment $PLLF_A$ is passed by the loop hold-off generator 50 to the correlation machine 40 as the frequency feedback adjustment $F_A$. The switch 52 is shown at the outputs of the AFC loop and PLL logic 44 and 46. However, it should be noted that there are other ways for the loop switch 52 to operate, such as at the input to the AFC loop and PLL logic 44 and 46 or by controlling clock or power to the AFC loop or PLL logic 44 and 46.

Figure 4:
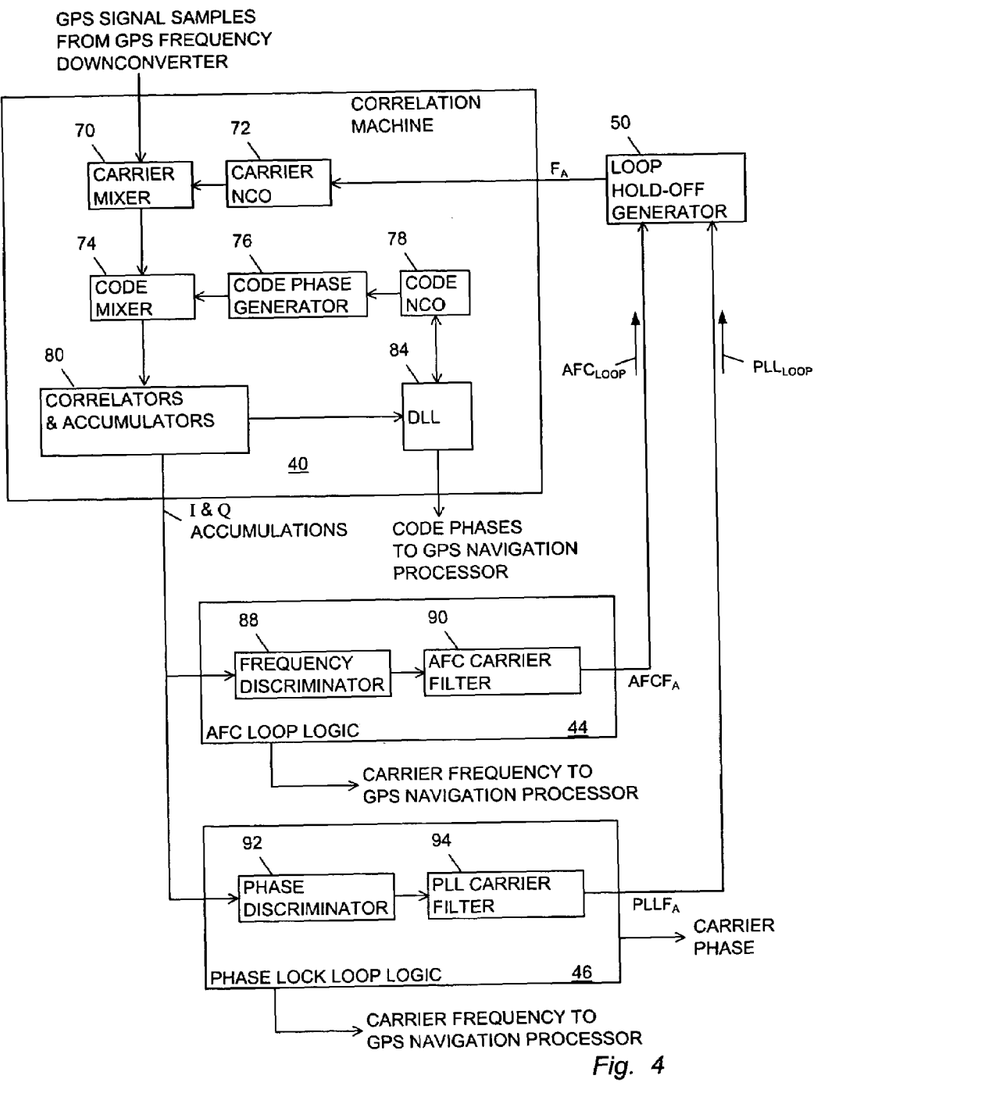
FIG. 4 is a block diagram of details of a correlation machine and loop logic for the GPS signal channel of FIG. 2.

The correlation machine 40 includes the digital signal processing and microprocessor hardware and software that use the GPS signal samples and the frequency feedback adjustment $F_A$ for providing in-phase I and quadrature phase Q correlation accumulations, and providing the measurements to the GPS navigation processor 34. Details of the correlation machine 40 are shown in FIG. 4 and described in the accompanying description below.

The signal strength detector 42 uses the I and Q accumulations from the correlation machine 40 for determining a signal strength that is representative of the strength of the incoming GPS signal at the output of the GPS antenna 12 for a GPS satellite having a particular selected signal code. The signal strength detector 42 compares the signal strength to a selected PLL transition threshold to determine a loop preference. When the signal strength is less than the PLL transition threshold, the loop preference is the AFC loop. When the signal strength is greater than the PLL transition threshold the loop preference is the phase lock loop.

When the PLL preference has been determined, the loop hold-off generator 50 assesses the status of additional location quality parameters before determining whether to make the transition from the AFC loop to the phase lock loop for the GPS signal channel 20. The parameters include experience and recent history of the GPS signal strength knowledge of recent or current transitions in other GPS signal channels 21–31, and the potential effect on the location fix that the transition is estimated to have.

A recent history of the GPS strength signal showing variability or inconsistency may be used in order to prevent or delay the loop transition. The GPS signal strength may be determined as variable or inconsistent when it is changing back and forth between greater than the PLL transition threshold and lesser than the PLL transition threshold. The GPS signal strength variability may also be determined by direct signal level measurements showing variation of the signal strength is greater than a selected variability threshold. The variability threshold may be selected empirically to improve the consistency of the location in field or simulated field tests by minimizing the location jumps and outages.

Examples of historical information and experience include the number of previous loop transitions for the GPS signal channel 20, the number of recent loop transitions for a specified time period for the GPS signal channel 20, and the elapsed time since the last previous transition was initiated for the GPS signal channel 20. Examples of knowledge from the other GPS signal channels 21–31 includes the elapsed time since the last previous transition was initiated for any of the other GPS signal channels 21–31 and information as to whether a loop transition in one of the other GPS signal channels 21–31 is still settling.

The potential effect of a transition is estimated by calculating conditional PDOPs when the pseudorange for the GPS signal channel 20 is taken out of the current location (position) fix. Position dilution of precision (PDOP) is a satellite constellation geometry calculation that is used as multiplicative factor for estimating an error of a location fix. A low PDOP indicates better accuracy than a high PDOP. In general the PDOP is low when the satellites are widely spaced in the sky and high when they are bunched. The conditional PDOP calculator 39 (FIG. 1) calculates the conditional PDOPs for GPS satellite constellations that use fewer satellites than the satellites currently being used for a location fix. When a GPS signal is being used in the computation of the location fix and it is being considered for transition from the AFC loop to the phase lock loop, the conditional PDOP calculator 39 calculates the conditional PDOP for the GPS constellation without the GPS satellite that is transmitting that GPS signal.

In the simplest case, four satellites are required and four satellites are currently being used for the location fix. The conditional PDOP is infinite when one satellite is removed. In another simple case, the current location fix may be using five GPS satellites for an over-determined solution. The conditional PDOP calculator 39 calculates the conditional PDOP for the GPS constellation of the four GPS satellites that does not include the GPS satellite that is transmitting GPS signal that is being considered for transition. Depending upon the geometry of the constellation of the four remaining satellites, the conditional PDOP may be significantly higher (if the satellite being removed is located in a geometrically important location) or largely unchanged (if the satellite being removed is nearly co-located with another satellite) than the PDOP calculated with all satellites.

It should be noted that the location quality parameters may be assessed together or individually for determining whether to make the loop transition. The parameters may be assessed in serial, or combined into a parameter combination having a single value and then assessed. The parameters in a combination may be weighted with scale factors. Sums or products of the parameters or scaled parameters may be used for the parameter combination.

Figure 3:
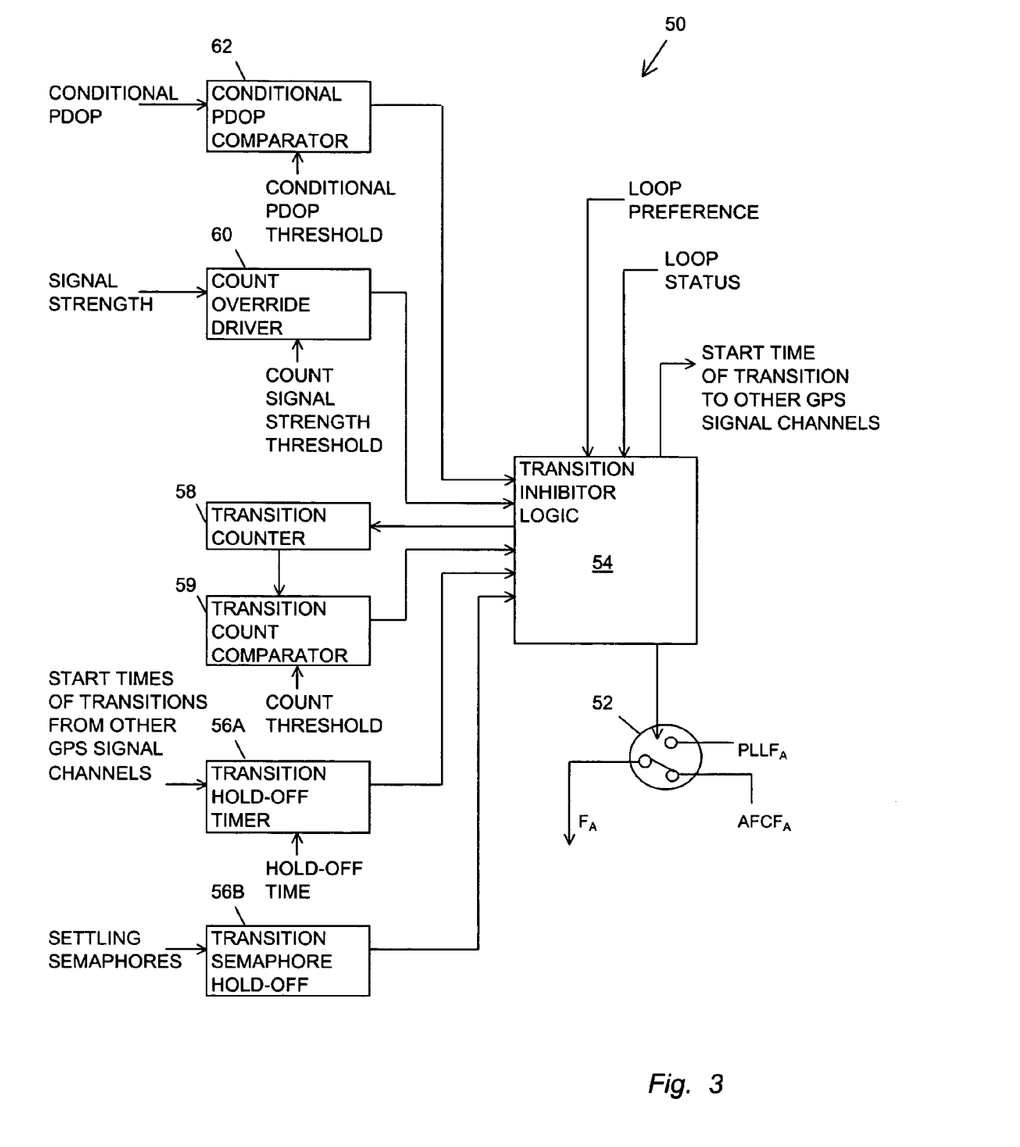
FIG. 3 is a block diagram of a transition hold-off generator for the GPS signal channel of FIG. 2.

FIG. 3 is a block diagram of the loop hold-off generator 50 of the present invention. The loop hold off generator 50 examines the history of loop transitions between the AFC loops and phase lock loops in the GPS receiver 10. When the recent history shows a pattern of back and forth transitions between the AFC loop and the phase lock loop in the GPS signal channel 20, or in certain cases the other GPS signal channels 22–31, the loop hold-off generator 50 generates the PLL hold-off.

The transition to a phase lock loop incurs a settling time during which the pseudorange from the GPS signal channel 20 is not available for determining a location fix. By generating the PLL hold-off when the GPS signal levels are jumping up and down, the GPS receiver 10 has fewer location fix outages when there are only a minimum number of GPS satellites for making a location fix and fewer location jumps caused by changing GPS constellations when the number of GPS satellites is greater than the minimum. The loop hold off generator 50 also examines one or more conditional PDOPs for the GPS satellite constellations not using the GPS signal channel 20. When the conditional PDOP is low, the loop hold off generator 50 may avoid the examination of the history of loop transitions and settling semaphores, or rescind the PLL hold-off.

The loop hold-off generator 50 includes the loop switch 52, transition inhibitor logic 54, a transition hold-off timer 56A (or a transition semaphore hold-off 56B), a transition counter 58, a transition count comparator 59, a count override driver 60 and a conditional PDOP comparator 62. The transition inhibitor logic 54 receives loop preference information and loop status information. The loop status information indicates when the AFC loop is currently being used for computing a location fix. The transition inhibitor logic 54 may control the loop switch 52 to make the loop transition to the phase lock loop when the AFC loop for this particular satellite is not being used and the loop preference is for the phase lock loop. An example of the AFC loop closed but not used for the location fix is when the GPS signal channel 20 first finds signal power for the assigned GPS satellite.

The transition hold-off timer 56A receives the times of loop transitions (times that the last previous transitions were initiated) from the transition inhibitor logics in the other GPS signal channels 20–31. The transition hold-off timer 56A compares a selected hold-off time (shown as eight seconds in FIG. 6) to the elapsed time from the time of transition. The hold-off time can be about the time that the phase lock loop takes to settle after the transition is initiated, typically one to ten seconds. Alternatively, the hold-off time may be a minute or more in order to reduce the frequency of transitions. When the elapsed time is less than the selected hold-off time, the transition inhibitor timer 54 controls the loop switch 52 to inhibit the loop transition to the phase lock loop.

The transition semaphore hold-off 56B may be used in place of or in addition to the transition hold-off timer 56A for generating a transition hold-off. The transition semaphore hold-off 56B receives semaphores from the correlation machines for the GPS signal channels 21–31 to indicate the time periods when the phase lock loops of the GPS signal channels 21–31 have begun a loop transition and are in the process of settling. When a settling semaphore is being received, the transition inhibitor timer 54 controls the loop switch 52 to inhibit the loop transition to the phase lock loop.

The transition counter 58 counts the number of loop transitions for the particular satellite. The transition count comparator 59 compares the count to a selected count threshold. The count override driver 60 receives the signal strength from the signal strength detector 42 and compares the signal strength to a selected count signal strength threshold (CNTOVR). The count signal strength threshold is higher than the PLL transition threshold. When the transition count is greater than the count threshold and the signal strength is not greater than the count signal strength threshold, the transition inhibitor logic 54 controls the loop switch 52 to inhibit the loop transition to the phase lock loop.

The conditional PDOP calculator 39 (FIG. 1) provides the conditional PDOPs to the PDOP comparator 62. The PDOP comparator 62 compares a selected conditional PDOP threshold to the conditional PDOP where the satellite assigned to the GPS signal channel 20 is not used in the location fix. When the conditional PDOP is less than the threshold, the PDOP comparator 62 issues a PDOP override to the transition inhibitor logic 54 to control the loop switch 52 to switch to the phase lock loop. An exemplary conditional PDOP threshold is in the range of three to one and a half.

FIG. 4 is a block diagram showing the loop hold-off generator 50 and further details of the correlation machine 40 and the AFC and PLL loop logic 44 and 46 for the GPS signal channel 20. The correlation machine 40 includes a carrier mixer 70, a carrier numerically controlled oscillator (NCO) 72, a code mixer 74, a replica code generator 76, a code NCO 78, correlators and accumulators 80, and a delay lock loop (DLL) 84.

The carrier mixer 70 multiplies the GPS signal samples from the GPS frequency downconverter 14 by a tracking LO signal from the carrier NCO 72. The carrier NCO 72 adjusts the frequency of its tracking LO signal according to the frequency feedback adjustment $F_A$ to track the effective carrier frequency of the GPS signal samples in order to minimize the carrier frequency Doppler in the incoming GPS signal. The code mixer 74 multiples the output of the carrier mixer 70 by the replica code from the code generator 76. The replica code generator 76 generates the assigned replica code at a code phase that is controlled by the code NCO 78.

The correlators and accumulators 80 receive the output of the code mixer 74 and provide the I and Q accumulations. The I and Q accumulations are passed to the AFC and PLL logic 44 and 46. The correlators and accumulators 80 also pass I and Q correlation information to the DLL 84. The DLL 84 uses the I and Q correlation information to drive the code NCO 78 and to provide the code phases to the GPS navigation processor 34.

The AFC loop logic 44 includes hardware and software for a frequency discriminator 88 and an AFC carrier filter 90. The frequency discriminator 88 uses the I and Q accumulations for providing an output that is indicative of the frequency difference, phase divided by time, between the effective frequency of the GPS signal samples and the frequency of the tracking LO signal from the carrier NCO 72. The output of the frequency discriminator 88 is filtered by the AFC carrier filter 90 and passed as the frequency feedback adjustment $AFCF_A$ to the loop hold-off generator 50. The AFC logic 44 also passes information regarding the carrier frequency to the GPS navigation processor 34.

The PLL logic 46 includes hardware and software for a phase discriminator 92 and a PLL carrier filter 94. The phase discriminator 92 uses the I and Q accumulations for providing an output that is indicative of the phase difference between the effective phase of the GPS signal samples and the phase of the tracking LO signal from the carrier NCO 72. The output of the phase discriminator 92 is filtered by the PLL carrier filter 94 and passed as the frequency feedback adjustment $PLLF_A$ to the loop hold-off generator 50. The AFC logic 46 also passes information for the carrier phase to the GPS navigation processor 34.

Figure 5:
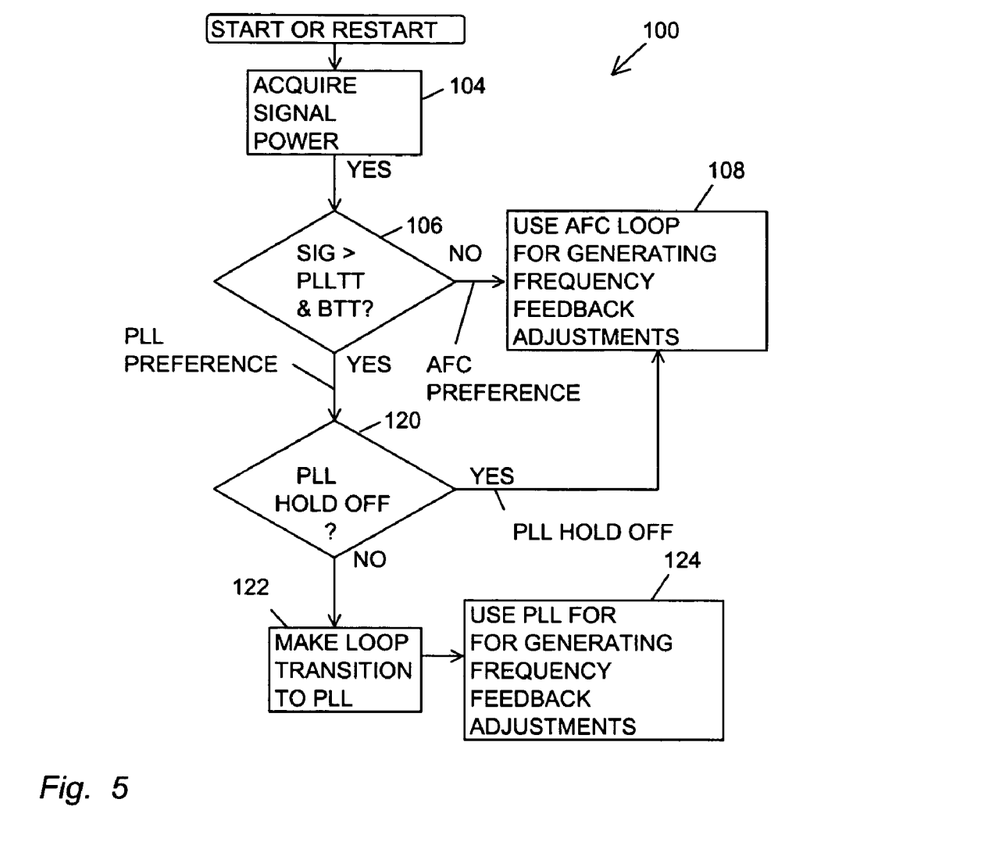
FIG. 5 is a flow chart of a method of the present invention that can be used in the GPS receiver of FIG. 1.

FIG. 5 is a flow chart of a method 100 that may be used by the GPS receiver 10 on a satellite-by-satellite basis for determining pseudoranges to GPS satellites having codes to which the respective GPS signal channels 20–31 are assigned. The pseudoranges are used computing location fixes. In a step 104 the GPS receiver 10 finds a carrier frequency and code phase where the GPS signal shows power.

When signal power is found the GPS receiver 10 will close an advance version of the AFC loop and attempt to detect the times of GPS bit transitions (BTT). In a step 106 when the advance AFC loop is closed and BTT is detected, the GPS receiver 10 compares the signal strength to the selected PLL transition threshold (PLLTT). The PLL transition threshold may be empirically determined as a tradeoff between having greater likelihood of phase lock cycle slips if it is set too low and a noisier location fix if it is set too high. An AFC preference is made when the signal strength is less than the PLL transition threshold. A PLL preference is made when the signal strength is greater than the PLL transition threshold.

In a step 108 for an AFC preference, the GPS receiver 10 uses the AFC loop for providing the frequency feedback adjustment $F_A$ for determining a pseudorange for the location fix. In a step 120 for a PLL preference, the transition hold-off generator 50 uses experience of previous loop transitions, information for the transitions in the other GPS signal channels 21–31, and conditional PDOPs for determining whether to make the loop transition from the AFC loop to the phase lock loop or to generate and invoke a PLL hold-off. Details of the step 120 are shown in the flow charts of FIGS. 6–8 and described in the accompanying descriptions below. When the PLL hold-off is invoked, the GPS receiver 10 continues to use the AFC loop as shown in the step 108.

When the PLL hold-off is not invoked, the GPS receiver 10 begins the loop transition to the phase lock loop in a step 122. The phase lock loop may take as long as several seconds to settle after the transition is started. When the phase lock loop is settled, then in a step 124 the GPS receiver 10 uses the phase lock loop for providing the frequency feedback adjustment $F_A$ for determining a pseudorange for the location fix. The GPS receiver 10 continues to use the phase lock loop until the GPS signal strength drops below the PLL transition threshold by a selected hysteresis. The hysteresis is selected in order to balance the risk of having phase lock loop cycle slips by using a phase lock loop when the hysteresis is too large versus the risk of having a greater number of transitions when the hysteresis is too small.

Figure 6:
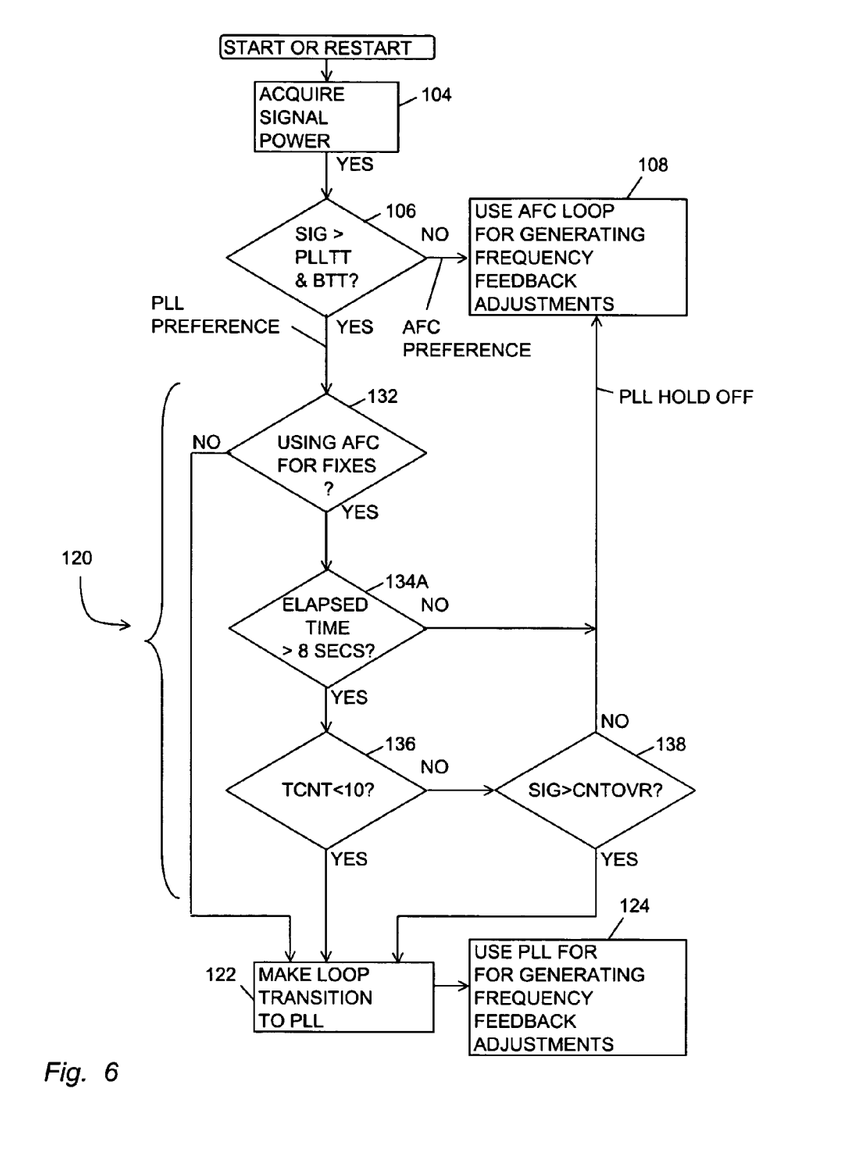
FIG. 6 is a flow chart of a PLL hold-off decision step of the method of FIG. 5.

FIG. 6 is a flow chart showing greater detail of the step 120 for determining whether to generate and invoke a PLL hold-off after the PLL preference has been determined. In a step 132 when the AFC loop is closed but the pseudorange derived from the raw code phase from the GPS signal channel 20 is not being used by the GPS navigation processor 34 for computing location fixes, the PLL hold-off is not invoked. When code phase or carrier frequency measurements are needed immediately, the step 108 may be invoked to use the AFC loop for GPS signal tracking.

However, normally the step 122 is invoked for closing the phase lock loop and giving the phase lock loop time to settle. Then, in the step 124 when the phase lock loop has settled, the GPS receiver 10 uses the phase lock loop for GPS signal tracking and determining the code and carrier phases for the measurements for computing location fixes.

On the other hand when the AFC loop is already being used for determining the pseudoranges for computing location fixes, a step 134A checks whether any of the GPS signal channels 20–31 that were being used for the computation of the location fixes have made a loop transition from their AFC loop to their phase lock loop within the selected hold-off time. In a preferred embodiment the selected hold-off time is about eight seconds.

When the elapsed time from the most recent loop transition is less than the hold-off time, the GPS receiver 10 continues to use the AFC loop for determining pseudoranges for computing location fixes in the step 108. When the elapsed time is greater than the hold-off time, the GPS receiver 10 in a step 136 checks whether the count of loop transitions (TCNT) for the particular GPS satellite of the GPS signal channel 20 is less than the selected transition count threshold (shown as ten in FIG. 6).

The TCNT count may be an absolute count of transitions after an event such as power-on or availability of the GPS satellite above the horizon mask, a resetting count of transitions after a last previous time tick, or a count density for counts in a certain time period. The time ticks for starting counts may be spaced at about one to thirty minutes and preferably about five to ten minutes. The selected time period for the count density may be about five to ten minutes or a range of one to thirty minutes. It should be noted that the TCNT is the number of transitions from the AFC loop to the phase lock loop.

When the number of loop transitions (TCNT) is less than the transition count threshold, the GPS receiver 10 transitions to the phase lock loop and then uses the phase lock loop for determining pseudoranges for computing location fixes in the steps 122 and 124. When the number of loop transitions is greater than the transition count threshold, the GPS receiver 10 in a step 138 checks whether the GPS signal strength for the particular GPS satellite is greater than a count signal strength threshold (CNTOVR). The count signal strength threshold is selected empirically for a tradeoff by balancing the location quality effect of delaying the transition for a solid GPS signal versus the location quality effect of making too many transitions when the GPS signal strength is varying.

When the GPS signal strength is greater than the count signal strength threshold, the GPS receiver 10 transitions to the phase lock loop and then uses the phase lock loop for determining pseudoranges for computing location fixes in the steps 122 and 124. When the GPS signal strength is less than the threshold CNTOVR, the GPS receiver 10 continues in the step 108 to use the AFC loop for determining pseudoranges for computing location fixes.

Figure 7:
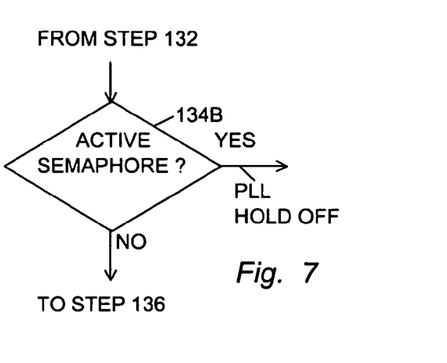
FIG. 7 is a flow chart of another embodiment of the PLL hold-off decision step of FIG. 6.

FIG. 7 is a flow chart of a second embodiment of the step 120 for determining whether to make the loop transition from the AFC loop to the phase lock loop or to generate a PLL hold-off. A step 134B replaces the step 134A. The step 134B checks whether settling semaphores are active for any of the GPS signal channels 21–31 that were being used for location fixes. When one or more of the settling semaphores is active, the GPS receiver 10 continues in the step 108 to use the AFC loop for determining pseudoranges for computing location fixes. When no settling semaphores are active, the GPS receiver 10 in the step 136 checks whether the TCNT for the particular GPS satellite of the GPS signal channel 20 is less than the selected transition count threshold and so on as described above.

Figure 8:
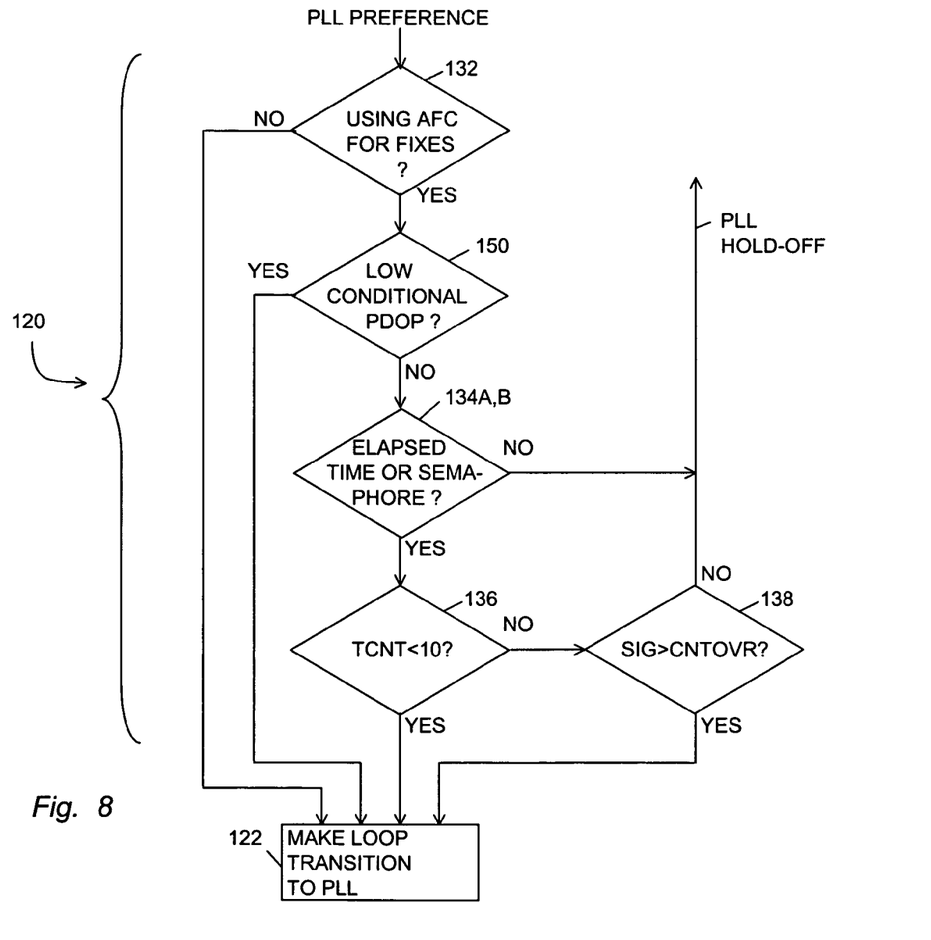
FIG. 8 is a flow chart of the hold-off decision step of FIG. 6 using a conditional PDOP.

FIG. 8 is a flow chart of a third embodiment of the step 120 for determining whether to make the loop transition from the AFC loop to the phase lock loop or to generate a PLL hold-off. A step 150 checks the conditional PDOP for the assigned GPS satellite against the conditional PDOP threshold. When the conditional PDOP is lower than the threshold, the GPS receiver 10 transitions to the phase lock loop and then uses the phase lock loop for determining pseudoranges for computing location fixes in the steps 122 and 124. When the conditional PDOP is greater than the threshold, the step 134A, B checks for elapsed time or active semaphores, the step 136 for testing TCNT and the step 138 for comparing to a higher signal strength as described above. It should be understood that the conditional PDOP evaluation step 150 may be before or after the steps 134A-B, 136 and 138.

Figure 9:
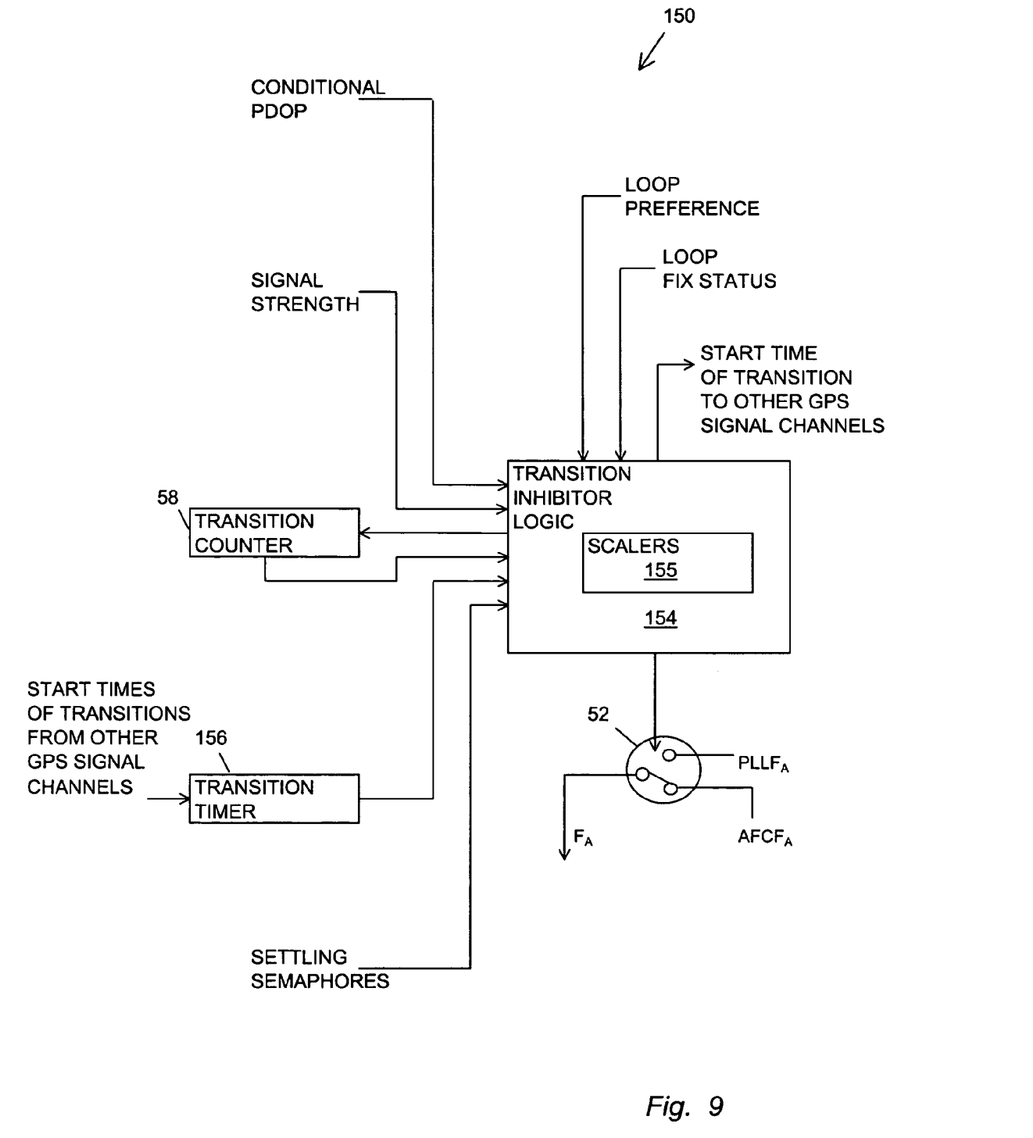
FIG. 9 is a block diagram of another embodiment of a transition hold-off generator for the GPS signal channel of FIG. 2.

FIG. 9 is a block diagram of a loop hold-off generator 150 of the present invention. The loop hold off generator 150 performs a similar function to the loop hold-off generator 50 described above for assessing location quality parameters for making a decision as to whether to make a transition from an AFC loop to a phase lock loop. However, where the loop hold-off generator 50 operates by reviewing and assessing parameters in a serial manner, the loop hold-off generator 150 operates by assessing the parameters in parallel.

The loop hold-off generator 150 includes the loop switch 52, the transition counter 58, transition inhibitor logic 154 including scalers 155, and a transition timer 156. The transition inhibitor logic 154 receives the loop preference information and the loop fix status information and controls the loop switch 52 to make the loop transition to the phase lock loop when the AFC loop for a particular GPS signal is not being used and the loop preference is for the phase lock loop for the GPS signal.

The transition counter 58 counts the number of loop transitions for the GPS signal channel 20 and passes the transition count as a location quality parameter to the transition inhibitor logic 154. The count may be a count of transitions after an event such as power-on or availability of the GPS satellite above the horizon mask; a count of transitions after a reset time tick; or a count for use in a computing a count density.

The transition timer 156 receives the start times of loop transitions from the other GPS signal channels 20–31, measures the elapsed times from the start times and passes the elapsed times as location quality parameters to the transition inhibitor logic 154. The transition inhibitor logic 154 receives the location quality parameters for the conditional PDOPs from the PDOP calculator 39 (FIG. 1), the signal strength from the signal strength detector 42, and the settling semaphores from the other GPS channels 21–31.

The scalers 155 weight the parameters according to scale factors. The transition inhibitor logic 154 combines the weighted scale factors into a score and uses the score for making a decision as to whether or not to make the loop transition. When a decision to make a loop transition is reached, the switch 52 is switched to the phase lock loop.

When a decision not to make a loop transition is reached, the PLL hold-off is generated and the loop transition is inhibited. A low transition count acts toward enabling the loop transition and a large count acts toward inhibiting the loop transition. A long elapsed time acts toward enabling the loop transition and a short elapsed time acts toward inhibiting the loop transition. A high GPS signal strength acts toward enabling the loop transition and a low GPS signal strength acts toward inhibiting the loop transition. A low conditional PDOP acts toward enabling the loop transition and a high conditional PDOP acts toward inhibiting the transition. The absence of settling semaphores acts toward enabling the loop transition and the presence of settling semaphores acts toward inhibiting the loop transition.

The scale factors may be derived empirically in order to provide the best tradeoff for a particular application between providing the fewest location outages and fewest location jumps on the one hand and providing the best location accuracy on the other hand. It should be understood that the scale factors may be linear or nonlinear and may be discontinuously dependent on the parameter that is being scaled. It should also be understood that the present invention may use a combination of the serial process described for the transition logic inhibitor 54 and the parallel process described for the transition logic inhibitor 154 for assessing the parameters before deciding whether to make a loop transition.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A method in a global navigation satellite system (GNSS) receiver for tracking GNSS signals, comprising:
   measuring a GNSS signal strength for a first GNSS signal;
   assessing one or more location quality parameters; and
   making a decision for a transition from an automatic frequency control (AFC) loop to a phase lock loop for tracking the first GNSS signal based upon the GNSS signal strength and the assessment of the parameters.

2. The method of claim 1, further comprising:
   using one or more of the GNSS signals including the first GNSS signal for computing a location;
   calculating a conditional position dilution of precision (PDOP) for the PDOP where the first GNSS signal is removed from the location computation; and wherein:
   the parameters include the conditional PDOP.

3. The method of claim 2, wherein:
   making the decision includes inhibiting the transition when the conditional PDOP exceeds a selected conditional PDOP threshold.

4. The method of claim 1, wherein:
   the parameters include a variability measurement of the GNSS signal strength.

5. The method of claim 4, wherein:
   making the decision includes inhibiting the transition when the variability measurement shows that the GNSS signal strength is inconsistent.

6. The method of claim 1, wherein:
   the parameters include a history of previous transitions from an AFC loop to a phase lock loop.

7. The method of claim 6, wherein:
   the history includes a count of the previous transitions for a time period; and
   making the decision includes inhibiting the transition when the transition count exceeds a selected transition count threshold.

8. The method of claim 7, wherein:
   assessing the location quality parameters includes assessing the parameters only when the GNSS signal strength is greater than a PLL transition threshold; and
   making the decision includes inhibiting the transition when the transition count exceeds the selected transition count threshold unless the GNSS signal strength exceeds a second signal strength threshold greater than the PLL transition threshold.

9. The method of claim 1, wherein:
   the parameters include an elapsed time from a start of a transition between an AFC loop and a phase lock loop.

10. The method of claim 9, wherein:
    making the decision includes inhibiting the transition when the elapsed time is less than a selected hold-off time.

11. The method of claim 1, wherein:
    the parameters include in progress transition information indicating a transition is currently in progress from an AFC loop to a phase lock loop.

12. The method of claim 11, wherein:
    making the decision includes inhibiting the transition when the current transition information indicates the transition is in progress.

13. The method of claim 1, wherein:
    the parameters include one or more of i) a count of previous loop transitions from an AFC loop to a phase lock loop, ii) a conditional position dilution of precision (PDOP) for the PDOP where the first GNSS signal is removed from a computation of location, iii) an elapsed time from a start of a transition from an AFC loop to a phase lock loop, and iv) information indicating that a transition is in progress from a AFC loop to a phase lock loop for tracking another GNSS signal.

14. The method of claim 13, wherein:
    making the decision includes scaling the parameters; combining the scaled parameters; and making the decision to transition based upon the combined scaled parameters.

15. A global navigation satellite system (GNSS) receiver for tracking GNSS signals, comprising:
    a signal strength detector for measuring a GNSS signal strength of a first GNSS signal;
    a loop hold-off generator for assessing one or more location quality parameters and making a decision for a transition from an automatic frequency control (AFC) loop to a phase lock loop for tracking the first GNSS signal based upon the GNSS signal strength and the location quality parameters.

16. The receiver of claim 15, further comprising:
    a navigation processor using one or more of the GNSS signals including the first GNSS signal for computing a location;
    a conditional position dilution of precision (PDOP) calculator for computing a conditional PDOP for the PDOP where the first GNSS signal is not used for the location computation; and wherein:
    the parameters include the conditional PDOP.

17. The receiver of claim 16, wherein:
    the loop hold-off generator inhibits the transition when the conditional PDOP exceeds a selected conditional PDOP threshold.

18. The receiver of claim 15, wherein:
    the parameters include a variability measurement of the GNSS signal strength.

19. The receiver of claim 18, wherein:
the loop hold-off generator inhibits the transition when the variability measurement shows inconsistency of the GNSS signal strength.

20. The receiver of claim 15, wherein:
the parameters include measurement for a history of previous transitions from an AFC loop to a phase lock loop.

21. The receiver of claim 20, wherein:
the history includes a count of the previous transitions for a time period; and
the loop hold-off generator inhibits the transition when the transition count exceeds a selected transition count threshold.

22. The receiver of claim 21, wherein:
the loop hold-off generator assesses the location quality parameters only when the GNSS signal strength exceeds a PLL transition threshold; and inhibits the transition when the transition count exceeds the selected transition count threshold unless the GNSS signal strength exceeds a second signal strength threshold greater than the PLL transition threshold.

23. The receiver of claim 15, wherein:
the parameters include an elapsed time from a start of a transition from an AFC loop to a phase lock loop.

24. The receiver of claim 23, wherein:
the loop hold-off generator inhibits the transition when the elapsed time is less than a selected hold-off time.

25. The receiver of claim 15, wherein:
the parameters include current transition information indicating a transition is in progress from an AFC loop to a phase lock loop.

26. The receiver of claim 15, wherein:
the loop hold-off generator inhibits the transition when the current transition information indicates the transition is in progress.

27. The receiver of claim 15, wherein:
the parameters include one or more of i) a count of previous loop transitions from an AFC loop to a phase lock loop, ii) a conditional position dilution of precision (PDOP) for a PDOP where the first GNSS signal is removed from a computation of location, iii) an elapsed time from a start of a transition from an AFC loop to a phase lock loop, and iv) information indicating that a transition is in progress from a AFC loop to a phase lock loop for tracking another GNSS signal.

28. The receiver of claim 27, wherein:
the loop hold-off generator applies scale factors to the parameters, combines the scaled parameters and makes the decision to transition according to the combined scaled parameters.

29. A global navigation satellite system (GNSS) receiver for tracking GNSS signals for determining location fixes, comprising:
one or more phase lock loops associated with one or more GNSS signals, respectively, a first of the phase lock loops for providing a first frequency feedback adjustment for tracking a first of the GNSS signals when a first GNSS signal strength for the first GNSS signal exceeds a PLL transition threshold unless a PLL hold-off is invoked;
one or more automatic frequency control (AFC) loops associated with the one or more GNSS signals, respectively, a first of the AFC loops for providing the first frequency feedback adjustment for tracking the first GNSS signal when the first GNSS signal strength is less than the PLL transition threshold or the first GNSS signal strength exceeds the PLL transition threshold and the PLL hold-off is invoked; and
a loop hold-off generator for assessing location quality parameters and generating the PLL hold-off when at least one of the location quality parameters indicates that the consistency of the location fixes will be degraded by a transition from the AFC loop to the phase lock loop.

30. The receiver of claim 29, wherein:
the parameters include a conditional position dilution of precision (PDOP) for the PDOP where the first GNSS signal is removed from use in the determinations of the location fixes; and further comprising:
a conditional PDOP calculator for calculating the conditional PDOP.

31. The receiver of claim 30, wherein:
the loop hold-off generator generates the PLL hold-off when the conditional PDOP exceeds a selected conditional PDOP threshold.

32. The receiver of claim 29, wherein:
the parameters include a variability measurement for the GNSS signal strength; and
the loop hold-off generator generates the PLL hold-off when the variability measurement exceeds a selected variability threshold.

33. The receiver of claim 29, wherein:
the parameters include experience of previous transitions from at least one of the AFC loops to at least one of the phase lock loops.

34. The receiver of claim 29, further comprising:
a transition counter for making a count of the transitions between the first AFC loop and the first phase lock loop during a time period; and wherein:
the parameters include the transition count.

35. The receiver of claim 34, wherein:
the loop hold-off generator generates the PLL hold-off when the transition count exceeds a selected transition count threshold.

36. The receiver of claim 34, wherein:
the loop hold-off generator generates the PLL hold-off when the transition count exceeds a selected transition count threshold and the first GNSS signal strength does not exceed a selected signal strength greater than the PLL transition threshold.

37. The receive of claim 29, wherein:
the parameters include an elapsed time following a start time of a transition from a second of the AFC loops to a second of the phase lock loops; and
the loop hold-off generator includes a transition hold-off timer for measuring the elapsed time and generating the PLL hold-off when the elapsed time is less than a selected hold-off time.

38. The receiver of claim 29, wherein:
the parameters include an indication when a transition is in progress from a second of the AFC loops to a second of the phase lock loops; and
the loop hold-off generator generates the PLL hold-off when the indication indicates the transition is in progress.

39. The receiver of claim 29, wherein:
the parameters include one or more of i) a count of previous loop transitions from the first AFC loop to the first phase lock loop, ii) a conditional position dilution of precision (PDOP) for the PDOP when the first GNSS signal is removed from use for the determination of location fixes, iii) an elapsed time from a previous loop transition from one of the AFC loops to one of the phase lock loops, and iv) information that a transition is in progress from one of the AFC loops to one of the phase lock loops.

40. The receiver of claim 39, wherein:
the loop hold-off generator scales the parameters, combines the scaled parameters, assesses the combined scaled parameters, and generates the PLL hold-off according to the assessment of the combined scaled parameters.

41. A method in a global navigation satellite system (GNSS) receiver for tracking GNSS signals for determining location fixes, comprising:
generating a first frequency feedback adjustment using a first of one or more phase lock loop for tracking a first of one or more GNSS signals when a first GNSS signal strength for the first GNSS signal exceeds a PLL transition threshold unless a PLL hold-off is invoked;
generating the first frequency feedback adjustment using a first of one or more automatic frequency control (AFC) loop for tracking the first GNSS signal when the first GNSS signal strength is less than the PLL transition threshold or the first GNSS signal strength exceeds the PLL transition threshold and the PLL hold-off is invoked;
assessing location quality parameters; and
generating the PLL hold-off when at least one of the location quality parameters indicates that the consistency of the location fixes will be degraded by a transition between the AFC loop and the phase lock loop.

42. The method of claim 41, further comprising:
calculating a conditional position dilution of precision (PDOP) for the PDOP where the first GNSS signal is removed from the determination of the location fixes; and wherein:
the parameters include the conditional PDOP.

43. The method of claim 42, wherein:
generating the PLL hold-off includes generating the PLL hold-off when the conditional PDOP exceeds a selected conditional PDOP threshold.

44. The method of claim 41, further comprising:
measuring signal strength variability for at least one of the GNSS signals; and wherein:
the parameters include the signal strength variability.

45. The method of claim 41, further comprising:
monitoring transitions from at least one of the AFC loops to at least one of the phase lock loops for providing a transition history; and wherein:
the parameters include the transition history.

46. The method of claim 41, further comprising:
counting the transitions between the first AFC loop and the first phase lock loop during a time period; and wherein:
the parameters include the transition count.

47. The method of claim 46, wherein:
generating the PLL hold-off includes generating the PLL hold-off when the transition count exceeds a selected transition count threshold.

48. The method of claim 46, wherein:
generating the PLL hold-off includes generating the PLL hold-off when the transition count exceeds a selected transition count threshold and the first GNSS signal strength does not exceed a selected signal strength, the selected signal strength greater than the PLL transition threshold.

49. The method of claim 41, wherein:
the parameters include an elapsed time from a start time of a transition from a second of the AFC loops to a second of the phase lock loops; and
generating the PLL hold-off includes comparing the elapsed time to a selected transition hold-off time and generating the PLL hold-off when the elapsed time is less than the selected hold-off time.

50. The method of claim 41, wherein:
the parameters include an indication when a transition is in progress between a second of the AFC loops and a second of the phase lock loops; and
generating the PLL hold-off includes generating the PLL hold-off when the indication indicates the transition between the second AFC loop and the second phase lock loop is in progress.

51. The method of claim 41, wherein:
the parameters include one or more of i) a count of previous loop transitions from one of the AFC loops and one of the phase lock loops, ii) a conditional position dilution of precision (PDOP) for the PDOP when the first GNSS signal is removed from use for the determination of the location fixes, iii) an elapsed time from a previous loop transition from one of the AFC loops to one of the phase lock loops, and iv) information that a transition is in progress from one of the AFC loops to one of the phase lock loops.

52. The method of claim 51, wherein:
assessing the parameters includes scaling the parameters, combining the scaled parameters and assessing the combined scaled parameters.

* * * * *